March 2, 1965 R. H. SHOQUIST 3,171,523
COIL CLUTCH WITH SEPARATE FRICTION BAND
Filed Aug. 30, 1961 3 Sheets-Sheet 2
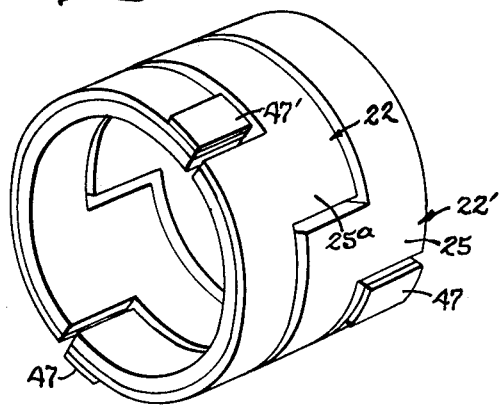
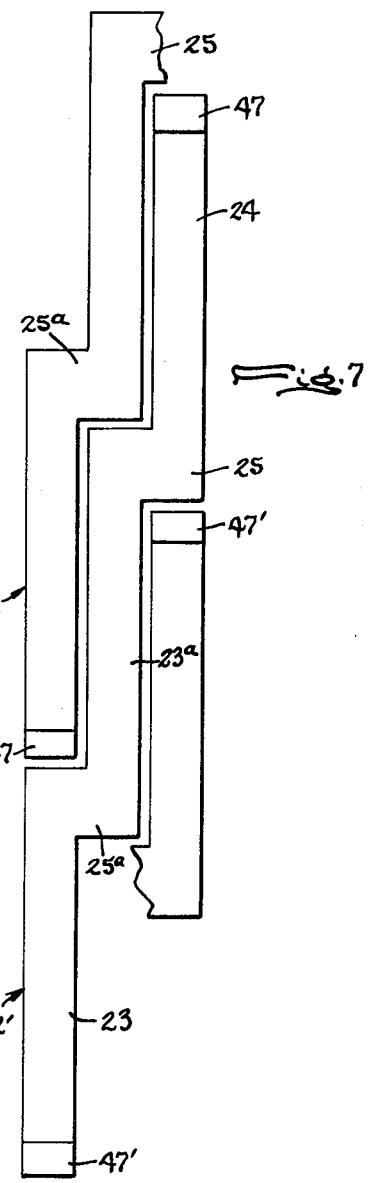
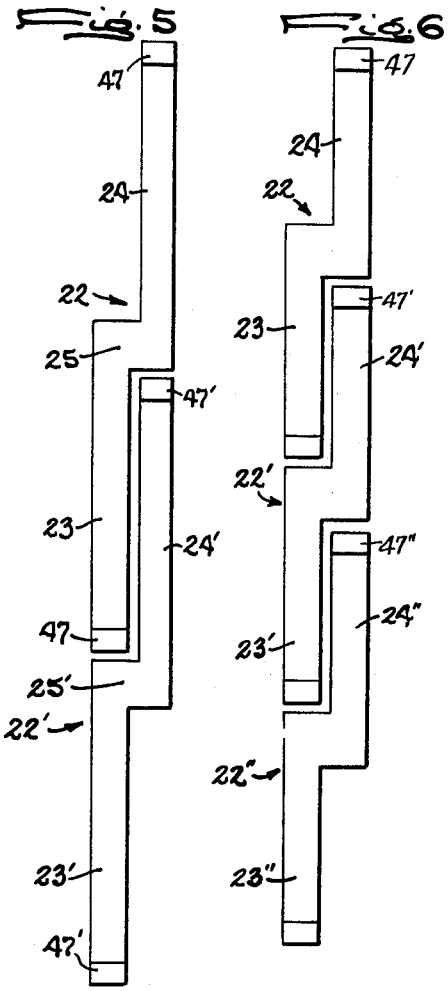
INVENTOR
Robert H. Shoquist
By Wolfe, Hubbard, Voit & Osann
ATTORNEY

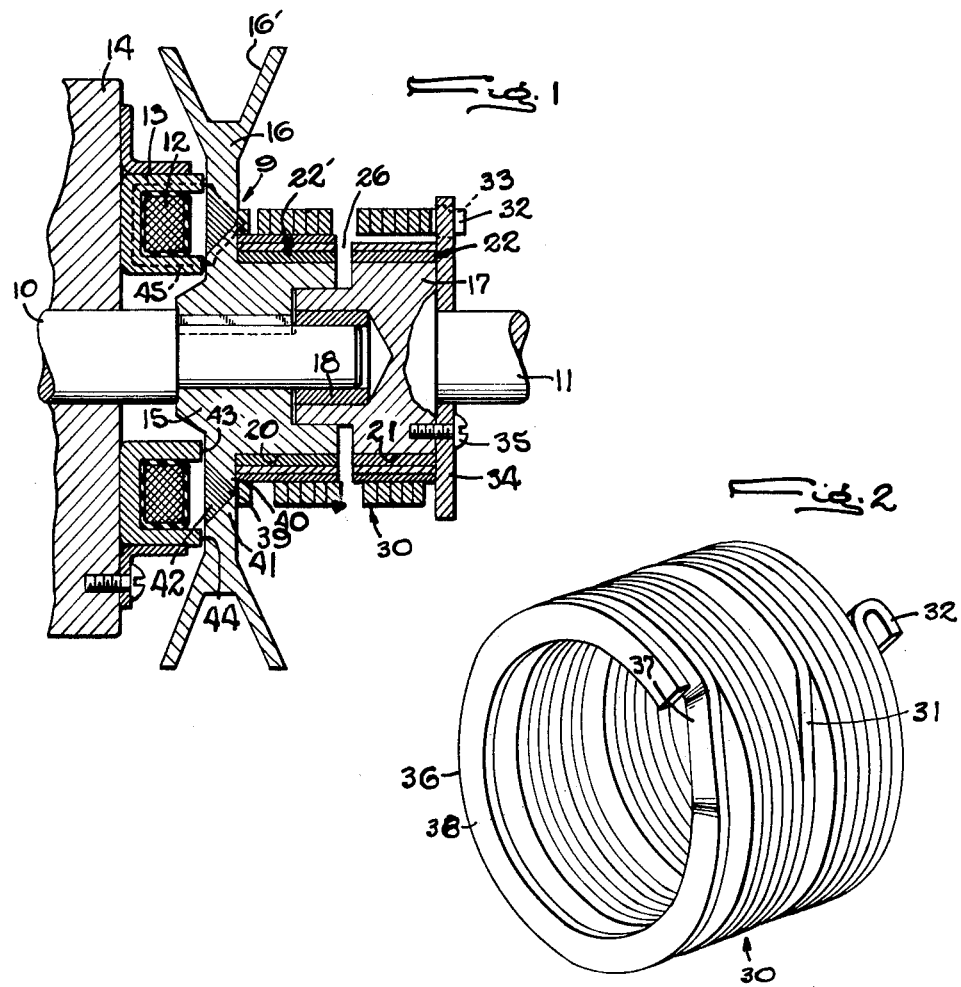

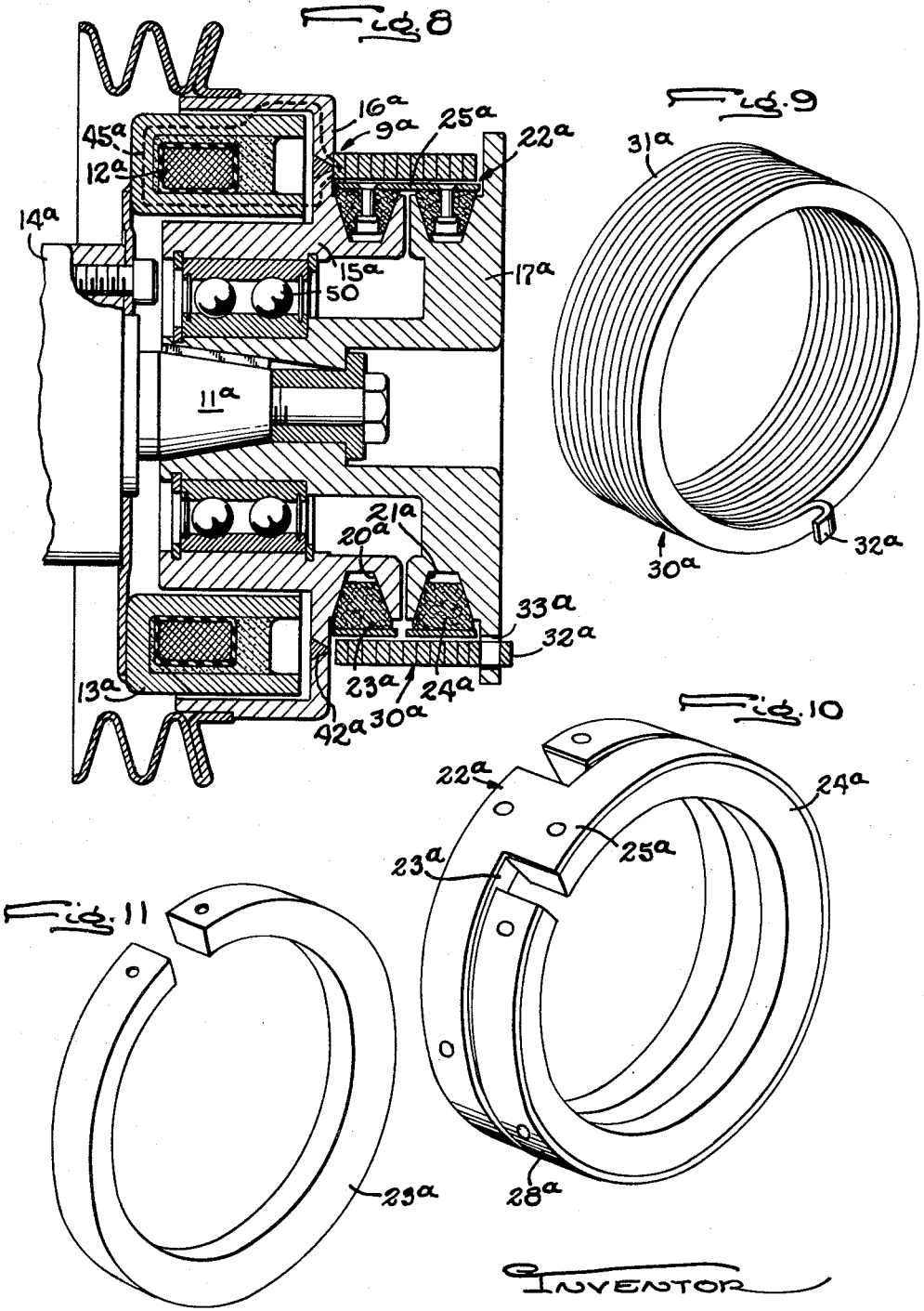

United States Patent Office 3,171,523
Patented Mar. 2, 1965

3,171,523
COIL CLUTCH WITH SEPARATE FRICTION BAND
Robert H. Shoquist, Roscoe, Ill., assignor to Warner Electric Brake & Clutch Company, South Beloit, Ill., a corporation of Delaware
Filed Aug. 30, 1961, Ser. No. 134,951
4 Claims. (Cl. 192—81)

This invention relates to friction brakes and clutches of the type in which a free floating expansible and contractible friction band is adapted to be pressed into gripping engagement with adjacent axially spaced friction surfaces on two relatively rotatable members.

One object is to provide a coupling of the above character having a band which will come into full engagement with both friction members in spite of differences in the sizes thereof.

A more detailed object is to provide a band having different arcuate areas offset axially from each other and engageable with the respective friction surfaces.

Another object is to combine two such S-shaped bands so as to cover substantially the full exial width and circumference of the two friction surfaces.

A further object is to localize the actuating pressures on opposite ends of the band so as to achieve an optimum wrapping effect and torque output.

A still further object is to provide for wedging engagement between the band and two friction surfaces and thereby augment the torque output.

Other objects and advantages of the invention will become apparent from the following detailed description taken in connection with the accompanying drawings, in which—

FIGURE 1 is a fragmentary cross-sectional view of a magnetic clutch embodying the novel features of the present invention.

FIG. 2 is a perspective view of the coil for actuating the friction band.

FIG. 3 is a perspective view of the friction band.

FIG. 4 is a similar perspective view showing a modified construction of the band.

FIG. 5 is a development view of the band as shown in FIG. 3.

FIG. 6 is a similar development view of a modified construction of the band.

FIG. 7 is a fragmentary development view of the band shown in FIG. 4.

FIGS. 8, 9 and 10 are views similar to FIGS. 1, 2 and 3 showing a modified form of magnetic clutch.

FIG. 11 is a perspective view of one of the friction shoes of the band shown in FIG. 10.

The present invention is equally applicable to friction brakes and clutches of either the expanding or contracting band type. In FIGS. 1 to 4, the invention is shown incorporated in a clutch of the contracting type for frictionally coupling a driving shaft 10 with a driven shaft 11 in response to energization of a magnetically controlled pilot friction clutch 9 having a multiple turn winding 12. The latter is disposed within a magnetic ring 13 of U-shaped cross-section concentric with the shafts and fixed to the end of a housing 14 in which the shaft 10 is journaled. Keyed to this shaft is the hub 15 of a disk 16 having a V-shaped peripheral groove 16' for receiving a driving V-belt. A hub 17 on the driven shaft 11 is supported by a bearing 18 on the outer end of the driving shaft. The hubs 15 and 17 thus form driving and driven drums relatively rotatable about a common axis.

In the form shown in FIG. 1, the surfaces 20 and 21 of the two drums are cylindrical and disposed in end to end relation. Telescoped with these surfaces is a friction band 22 which, in accordance with the present invention, comprises two arcuate shoes 23 and 24 arranged in end to end relation but offset axially from each other in for gripping engagement with the respective drum surfaces 20, 21. The shoes are of uniform width throughout their lengths and are joined together by a cross-piece or bridge 25 spanning the gap 26 between the adjacent ends of the two drums and rigidly connected to opposite ends to the adjacent ends of the two shoes. The band 22 is thus generally S-shaped with opposite end portions 23, 24 paralleling each other and extending nearly half way around the respective drums.

In order to utilize substantially the entire area of the two drum surfaces in deriving the clutching torque, a second band 22' of the same construction is interfitted with a first band 22 as shown in FIG. 3 so that the connecting bridges 25 and 25' of the two bands are disposed on diametrically opposite sides of the drums with the shoes 23, 24' and 23', 24 lying in edge to edge relation and covering corresponding halves of the respective drums. Each S-shaped band 22, 22' may be formed as a single integral piece of suitable friction material but is composed in the present instance of a layer 27 (FIG. 3) of non-metallic material such as ordinary brake lining bonded or otherwise secured to the inner surface of a flexible sheet 28 of metal.

Contraction of the bands 22, 22' into gripping engagement with the two drums is effected by winding up a coil 30 of resilient wire, preferably of rectangular cross-section, wound into the form of a helix and having opposite end portions respectively telescoped loosely around the pairs of shoes 23, 23' and 24, 24'. The two end portions are spaced apart axially at the gap 26 with the adjacent ends joined by a diagonally extending length 31 of the wire spanning the gap. One end of the coil is bent reversely into U-shape as indicated at 32 and hooked through a hole 33 in a disk 34 which is clamped by screws 35 to the outer end of the driven drum 17.

The turn 36 at the opposite end of the actuator coil is connected to the adjacent run by a diagonal extension 37 and thus presents a flat end face 38 disposed substantially in an axial plane. This turn constitutes the armature and driven element of the magnetic pilot clutch 9 and spans a narrow radial gap 39 between pole faces 40 and 41 formed by inner and outer portions of the driving disk 16 and rigidly joined by a non-magnetic filling 42. On the opposite side of the disk, the pole pieces are disposed close to the end faces 43, 44 of the stationary magnet core 13 with which the rotating pole pieces and the armature cooperate to form a magnetic flux path 45 of toroidal shape.

When the winding 12 is de-energized, the pole pieces turn freely relative to the armature 38, and the actuator coil 30 remains expanded and the driving and driven drums uncoupled. Upon energization of the winding, the armature is attracted to the poles thus engaging the pilot clutch 9 to a friction pilot torque which turns the armature with the driving disk 16. This winds up the actuator coil contracting the same around the bands 22, 22' and compressing the shoes 23, 23' and 24, 24' around and against the respective drums which are thus coupled together frictionally to transmit substantially all of the torque required for overcoming the load on the driven shaft 11. This torque is divided between the bands 22 and 22' and transmitted from one shoe thereof to the other through the bridges 25 and 25'. When the winding 12 is again de-energized, the actuator coil 30 expands thus releasing the pressure on the bands 22, 22' and uncoupling the two drums.

The total torque developed in the manner above described may be increased by providing for the development of a substantial wrapping action by the bands 22, 22'. For this purpose, tabs or raised portions 47 and 47' are secured to the ends of each of the two bands so that the pressure derived from winding up of the actuator coil 30 will be concentrated on these areas. The friction resulting from this increased pressure augments the wrapping action which is developed through the lengths of the two bands and proportionately magnifies the total developed torque.

If desired, more than two of the S-shaped bands may be used for frictionally coupling the two drums. Thus, by extending the shoes of the individual bands over only one-third of a revolution as shown in FIG. 6, three bands may be used. With such an arrangement, optimum wrapping action and total torque will be developed by providing tabs 47, 47' and 47'' on the trailing end portions of the three bands.

As an alternative, the number of shoes forming each band 22, 22' may be increased to three by providing two bridges 25 and 25ª between terminal shoes 23, 24 and an intermediate shoe 23 connecting the bridges. The two shoes would then be arranged relative to each other as shown in FIGS. 4 and 7.

An even greater amplification of the pilot clutch torque may be achieved by making the drum surfaces of V-shaped cross-section as in the modification shown in FIGS. 8 to 11 in which the parts corresponding to the clutch shown in FIG. 1 are indicated by the same reference numerals with the addition of letter *a* respectively. In this instance, the driving disk 16ª is journaled on a bearing 50 supported by the hub of the driven drum 17ª which is keyed to the driven shaft 11ª.

In this construction, there is only one S-shaped band 22ª with the opposite end portions or shoes 23ª and 24ª which extend around the drum surfaces 20ª and 21ª substantially a full revolution. As before, the adjacent ends of these shoes are joined together rigidly by a crosspiece or bridge 25ª. The shoes may be made as separate split rings of brake lining material as shown in FIG. 11 and riveted to an S-shaped metallic supporting strip 28ª.

Opposite side surfaces of shoes 23ª and 24ª of the band 22ª converge inwardly at an included angle of about thirty degrees so that the band shoes 23ª, 24ª act as wedges which are compressed against the drum surfaces 20ª and 21ª under increased pressure as compared to the radial pressure exerted by the actuator coil 30ª when it is wound up in response to energization of the magnetic pilot clutch. The torque output of the clutch is thus augmented in accordance with the wedging action thus obtained.

In both forms of the improved coupling above described, it will be apparent that each friction band is divided into axially spaced friction shoes which engage the respective driving and driven drum surfaces and at the same time may assume different diameters in order to come into full gripping engagement with these surfaces. As a result, each band adapts itself automatically to the contour and size of its drum thereby compensating for differences in service use. As a consequence, the torque output is more directly proportional to the pilot clutch torque and variations in wear during service use are of no consequence.

I claim as my invention:

1. In a torque producing device, the combination of, two members mounted for relative rotation and having peripheral friction surfaces concentric with a common axis and disposed in end to end relation, an arcuate free floating friction band telescoped with respect in end to end relation and offset axially from each other for gripping engagement with the respective ones of said surfaces, the medial portion of said band extending across the gap between said surfaces and rigidly joining said end portions together, a helical coil surrounding said band, selectively controllable means for utilizing the relative motion between said members to control the winding and unwinding of said coil, said end portions of each of said bands being of V-shaped cross-section and said friction surfaces comprising grooves complementing the cross-section shape of said bands.

2. In a torque producing device, the combination of, two members mounted for relative rotation and having peripheral friction surfaces concentric with a common axis and disposed in end to end relation, an arcuate free floating friction band telescoped with respect to said members and having paralleled opposite end portions disposed in end to end relation and offset axially from each other for gripping engagement with the respective ones of said surfaces, the medial portion of said band extending across the gap between said surfaces and rigidly joining said end portions together, a helical coil surrounding said band, selectively controllable means for utilizing the relative motion between said members to control the winding and unwinding of said coil, and a second band similar to said first band and interfitting with the latter with the opposite end portions thereof engageable respectively with the surfaces of the respective ones of said members and the medial portion thereof disposed between the ends of said first band.

3. In a torque producing device, the combination of, two members relatively rotatable about a common axis and disposed in end to end relation, friction surfaces of substantially equal diameters on the respective members, a friction band comprising a pair of arcuate friction shoes conforming to the curvature of said surfaces and arranged end to end around the latter, a bridge extending across the gap between said members and rigidly joining the adjacent ends of said shoes to offset the latter axially for gripping engagement with the respective ones of said surfaces, a second similar friction band having its bridge disposed between the free ends of said first band and its shoes lying in the planes of the first shoes for engagement with the same areas of said surfaces, lugs outstanding from the free ends of each of said bands and having arcuate areas of equal radii concentric with said axis, a helical coil closely telescoped with said bands, and selectively controllable means for utilizing the relative turning of said members to control the winding and unwinding of said coil and the application of radial pressure to said shoes and the release of such pressure.

4. In a torque producing device, the combination of, two members mounted for relative rotation and having peripheral friction surfaces concentric with a common axis and disposed in end to end relation and separated by a gap disposed in a transaxial plane, and arcuate free floating friction band having a medial portion and opposite end portions of substantially greater arcuate length than paid medial portion extending around the respective surfaces and disposed in end to end relation in axially spaced planes perpendicular to said axis for gripping engagement with the respective surfaces and opposite sides of said gap, the said medial portion of said band extending transversely of said end portions and parallel to said axis and across said gap so as to join the adjacent ends of said end portions together, a helical coil telescoped around said band for compressing the full length thereof against said surfaces, and selectively controllable means for utilizing the relative motion between said members to control the winding and unwinding of said coil.

References Cited in the file of this patent

UNITED STATES PATENTS

| | | |
|---|---|---|
| 839,480 | Jager | Dec. 25, 1906 |
| 1,182,589 | Schnuck | May 9, 1916 |
| 1,553,515 | Dennison | Sept. 15, 1925 |
| 1,741,438 | Schettler | Dec. 31, 1929 |

FOREIGN PATENTS

| | | |
|---|---|---|
| 112,158 | Germany | Aug. 13, 1900 |
| 44,261 | Sweden | July 10, 1918 |
| 85,862 | Austria | Oct. 10, 1921 |
| 861,235 | France | Oct. 22, 1940 |